(12) United States Patent
Khieu et al.

(10) Patent No.: US 7,254,599 B2
(45) Date of Patent: Aug. 7, 2007

(54) AVERAGE CODE GENERATION CIRCUIT

(75) Inventors: Cong Q. Khieu, San Jose, CA (US); Louise Gu, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 799 days.

(21) Appl. No.: 10/158,695

(22) Filed: May 30, 2002

(65) Prior Publication Data

US 2003/0225804 A1   Dec. 4, 2003

(51) Int. Cl.
G06F 7/38 (2006.01)

(52) U.S. Cl. .................................... 708/445

(58) Field of Classification Search ................ 708/445, 708/671
See application file for complete search history.

(56) References Cited

U.S. PATENT DOCUMENTS

| | | | | |
|---|---|---|---|---|
| 4,368,433 A | * | 1/1983 | Imazeki et al. ............. 327/126 |
| 4,789,953 A | * | 12/1988 | Gerrath ....................... 708/300 |
| 5,751,617 A | * | 5/1998 | Wong ......................... 708/445 |
| 5,883,824 A | * | 3/1999 | Lee et al. ................... 708/445 |
| 5,955,894 A | | 9/1999 | Vishwanthaiah et al. ..... 326/86 |
| 5,999,978 A | | 12/1999 | Angal et al. ................ 709/229 |
| 6,007,232 A | * | 12/1999 | Wong ......................... 708/445 |
| 6,060,907 A | | 5/2000 | Vishwanthaiah et al. ..... 326/87 |
| 6,064,656 A | | 5/2000 | Angal et al. ................ 370/254 |
| 6,085,033 A | | 7/2000 | Starr et al. ............. 395/500.15 |
| 6,212,511 B1 | | 4/2001 | Fisher et al. ................... 707/1 |
| 6,226,664 B1 | * | 5/2001 | Ng et al. ..................... 708/683 |
| 6,278,306 B1 | | 8/2001 | Ang et al. ................... 327/170 |
| 6,281,729 B1 | | 8/2001 | Ang et al. ................... 327/170 |
| 6,294,924 B1 | | 9/2001 | Ang et al. ..................... 326/30 |
| 6,297,677 B1 | | 10/2001 | Ang et al. ................... 327/170 |
| 6,316,957 B1 | | 11/2001 | Ang et al. ..................... 326/30 |
| 6,339,351 B1 | | 1/2002 | Ang et al. ................... 327/170 |
| 6,366,139 B1 | | 4/2002 | Ang et al. ................... 327/108 |
| 6,420,913 B1 | | 7/2002 | Ang et al. ................... 327/108 |
| 6,795,841 B2 | * | 9/2004 | Dijkstra ...................... 708/445 |
| 2003/0097389 A1 | * | 5/2003 | Saulsbury et al. .......... 708/445 |

* cited by examiner

*Primary Examiner*—Tan V. Mai
(74) *Attorney, Agent, or Firm*—Dorsey & Whitney LLP

(57) ABSTRACT

Disclosed is a method and circuit for generating an average binary code from at least two input binary codes. The circuit may be employed in an integrated circuit having first and second circuits for generating binary codes $a_{m-1:0}$ and $b_{m-1:0}$, respectively. In one embodiment, the circuit asynchronously generates a binary code $c_{m-1:0}$ representing an average of the binary codes $a_{m-1:0}$ and $b_{m-1:0}$ generated by the first and second circuits, respectively.

14 Claims, 9 Drawing Sheets

(1) 0 0 0 0 0 0 0 0
(2) 1 0 0 0 0 0 0 0
(3) 1 1 0 0 0 0 0 0
(4) 1 1 1 0 0 0 0 0
(5) 1 1 1 1 0 0 0 0
(6) 1 1 1 1 1 0 0 0
(7) 1 1 1 1 1 1 0 0
(8) 1 1 1 1 1 1 1 0
(9) 1 1 1 1 1 1 1 1

AVERAGE CODE GENERATION CIRCUIT

BACKGROUND OF THE INVENTION

Integrated circuits including microprocessors often contain sub-circuits that generate multibit binary codes for controlling other sub-circuits within the integrated circuit. Often times, these integrated circuits require the averaging of two or more of the multibit binary codes, the result of which is used to control another sub-circuit. Typically, an adder sub-circuit and a divider sub-circuit operating together perform the function of averaging binary codes.

FIG. 1 illustrates relevant components of an integrated circuit 10 in block diagram form. Integrated circuit 10 includes sub-circuits 12-20. More particularly integrated circuit 10 includes first and second code generation sub-circuits 12 and 14, having outputs coupled to a pair of inputs of average code generation sub-circuit 16. Lastly integrated circuit 10 includes a sub-circuit 20 having an input which is coupled to the output of average code generation sub-circuit 16. For purposes of explanation, the term coupled circuits means that two circuits or sub-circuits that are directly or indirectly coupled together. For example, first code generation sub-circuit 12 is coupled to sub-circuit 20 although coupled via average code generation sub-circuit 16.

Average code generation sub-circuit 16 operates upon binary codes $a_{m-1:0}$ and $b_{m-1:0}$. More particularly, average code generation circuit generates an average binary code $c_{m-1:0}$ which represents the average of binary codes $a_{m-1:0}$ and $b_{m-1:0}$. Average code generation sub-circuit 16 is a synchronous circuit and operates as a function of a clock signal (CLK) received thereby. In other words, average code generation sub-circuit 16 generates binary code $c_{m-1:0}$ upon a falling or rising edge of the clock signal CLK. It is noted that first and second code generation circuits 12 and 14 are also shown to be synchronous sub-circuits. Average binary code $c_{m-1:0}$ is provided to sub-circuit 20 which in turn performs some function in response to receiving $c_{m-1:0}$.

FIG. 2 illustrates, in block diagram form, the relevant components of average code generation sub-circuit 16 of FIG. 1. More particularly, average code generation sub-circuit shown 16 in FIG. 2 includes an adder sub-circuit 22 coupled to a divider sub-circuit 24. The adder and divider sub-circuits 22 and 24, respectively, are shown as synchronous circuits in that they operate as a function of the clock signal CLK provided thereto. Adder sub-circuit 22 receives binary codes $a_{m-1:0}$ and $b_{m-1:0}$ from first and second code generations sub-circuits 12 and 14, respectively. In response, adder sub-circuit 22 generates $c'_{m-1:0}$ which represents an addition of binary codes $a_{m-1:0}$ and $b_{m-1:0}$. Divider sub-circuit 24 operates to divide $c'_{m-1:0}$ by two to generate average binary code $c_{m-1:0}$.

One goal in integrated circuit design is to reduce the total substrate area occupied by the integrated circuit. Unfortunately, the adder and divider sub-circuits 22 and 24 may occupy a substantial area of the substrate upon which integrated circuit 10 is formed. Another goal in integrated circuit design is to reduce the complexity of sub-circuits. The adder and divider sub-circuits 22 and 24 are generally complex (i.e., they consist of a large number of interconnected gates) and require substantial design effort to implement and verify. Still yet another goal in integrated circuit design is to increase the speed at which the integrated circuit or sub-circuits thereof operate. Adder and divider circuits 22 and 24 are synchronous. A certain amount of time delay exists between generation of the average binary code $c_{m-1:0}$ from the input binary codes $a_{m-1:0}$ and $b_{m-1:0}$. This time delay is dependent upon the frequency of the clock signal CLK provided to adder and divider sub-circuits 22 and 24.

SUMMARY OF THE INVENTION

Disclosed is a method and circuit for generating an average binary code from at least two input binary codes. The circuit may be employed in an integrated circuit having first and second circuits for generating binary codes $a_{m-1:0}$ and $b_{m-1:0}$, respectively. In one embodiment, the circuit asynchronously generates a binary code $c_{m-1:0}$ representing an average of the binary codes $a_{m-1:0}$ and $b_{m-1:0}$ generated by the first and second circuits, respectively.

BRIEF DESCRIPTION OF THE DRAWINGS

The present invention may be better understood, and its numerous objects, features and advantages made apparent to those skilled in the art by referencing the accompanying drawings. The use of the same reference number throughout the Figures designates a like or similar element.

Figure 1:
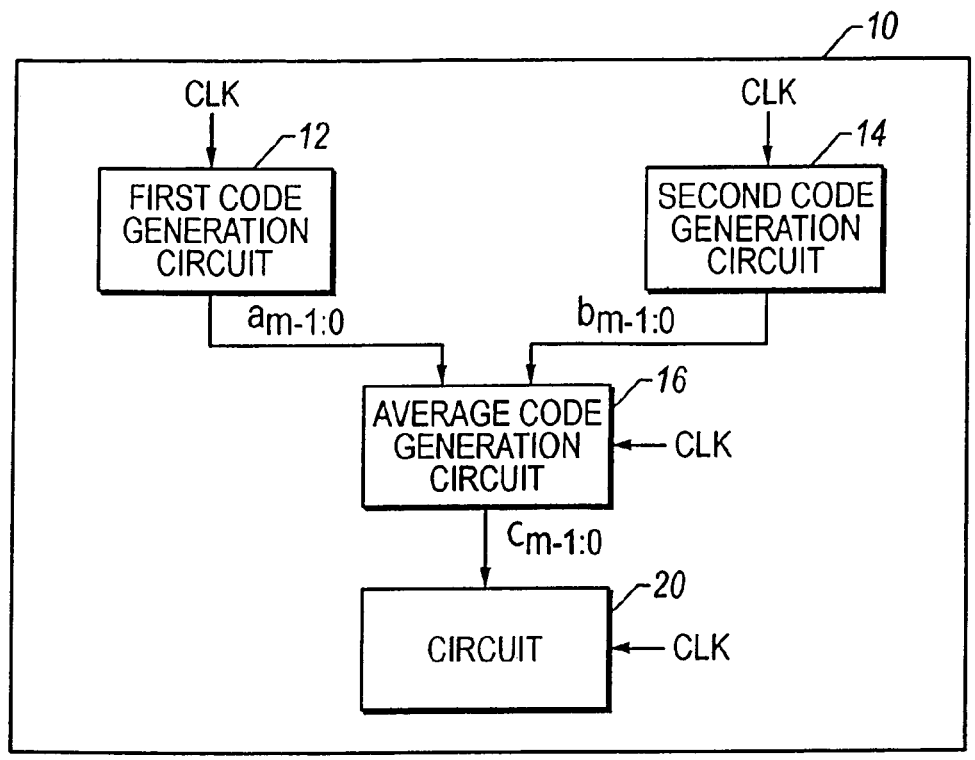
FIG. 1 is a block diagram illustrating relevant components of an integrated circuit.
Figure 2:
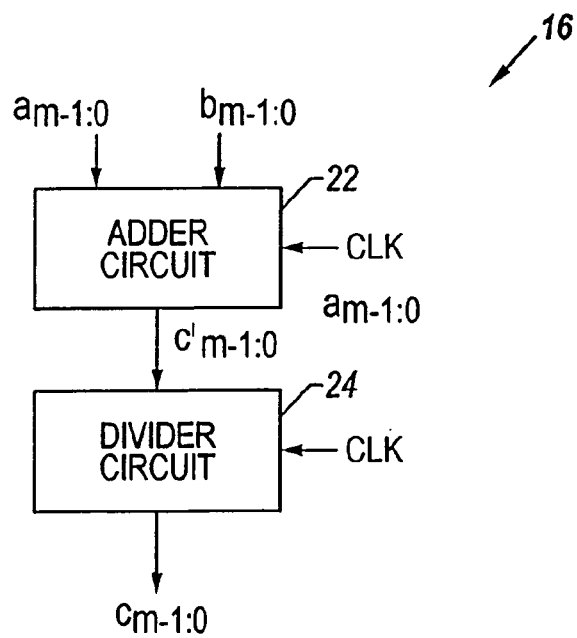
FIG. 2 is a block diagram illustrating relevant components of the average code generation circuit shown in FIG. 1.

While the invention is susceptible to various modifications and alternative forms, specific embodiments thereof are shown by way of example in the drawings and will herein be described in detail. However, the drawings and detailed description thereto are not intended to limit the invention to the particular form disclosed. On the contrary, the intention is to cover all modifications, equivalents, and alternatives falling within the spirit and scope of the present invention as defined by the appended claims.

DETAILED DESCRIPTION

Figures 3, 4:
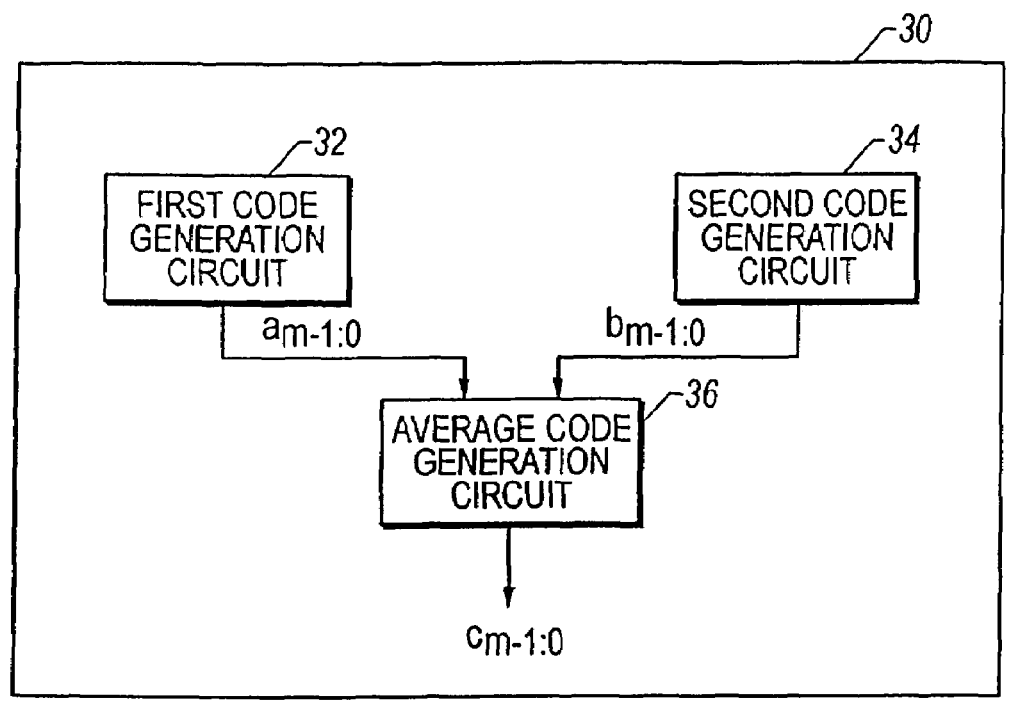
FIG. 3 is a block diagram illustrating relevant components of an integrated circuit employing the present invention.
FIG. 4 illustrates exemplary states of the binary codes $a_{m-1:0}$, $b_{m-1:0}$, and $c_{m-1:0}$.

FIG. 3 illustrates relevant components of an integrated circuit 30 implying one embodiment of the present invention. Integrated circuit 30 may take many forms including a microprocessor having a plurality of input and output devices that communicate with a memory device via an intervening data bus. FIG. 3 shows first and second code generation sub-circuits 32 and 34 coupled to an average code generation sub-circuit 36. First and second code generation sub-circuits 32 and 34, respectively, generate binary codes $a_{m-1:0}$ and $b_{m-1:0}$ respectively. Average code generation sub-circuit 36 includes a pair of inputs for receiving respective binary codes $a_{m-1:0}$ and $b_{m-1:0}$. It is noted that average code generation sub-circuit 36 should not be limited to a two input circuit.

It is noted that unlike the average code generation sub-circuit 16 shown in FIG. 1, average code generation sub-circuit 36 shown in FIG. 3 is an asynchronous circuit. In other words, no clock signal is provided to average code generation sub-circuit 36 shown in FIG. 3. Average code generation sub-circuit 36 generates average binary code $c_{m-1:0}$ almost immediately upon receiving $a_{m-1:0}$ and $b_{m-1:0}$. Thus, average code generation sub-circuit 36 shown in FIG. 3 generates average binary code $c_{m-1:0}$ in a shorter amount of time when compared to average code generation circuit shown in FIG. 1.

The present invention will be described with reference to first and second generation sub-circuits 32 and 34 generating 8 bit binary codes $a_{7:0}$ and $b_{7:0}$, respectively, and with average code generation sub-circuit 36 generating an 8 bit average binary code $c_{7:0}$ in response to average code generation sub-circuit 36 receiving binary codes $a_{7:0}$ and $b_{7:0}$. The present invention should not be limited thereto.

Average code generation sub-circuit 36 generates average binary code c7:0. in response to receiving binary codes $a_{7:0}$ and $b_{7:0}$. Although not shown in the figures, the average code $c_{7:0}$ generated by sub-circuit 36 may be used to control delay circuits 44(0)-44(7) of U.S. patent application Ser. No. 10/159,090, filed May 30, 2002, entitled "Variably Controlled Delay Line for Read Data Capture Timing Window" by Cong Khieu and Louise Gu, which is incorporated herein by reference in its entirety. The average code generation sub-circuit 36 of FIG. 3 may be employed to generate an average of pull-up and pull-down control codes generated by pull-up and pull-down control circuits, respectively, described in U.S. Pat. No. 6,060,907 which is incorporated herein by reference in its entirety. It is noted, however, that the pull down control code CNT BIT 1D-CNT BIT 8D generated by the pull down control circuit described in U.S. Pat. No. 6,060,907, may need to be remapped in accordance with the following:

| | | |
|---|---|---|
| CNT BIT 1D | → | $b_7$ |
| CNT BIT 2D | → | $b_6$ |
| CNT BIT 3D | → | $b_5$ |
| CNT BIT 4D | → | $b_4$ |
| CNT BIT 5D | → | $b_3$ |
| CNT BIT 6D | → | $b_2$ |
| CNT BIT 7D | → | $b_1$ |
| CNT BIT 8D | → | $b_0$. |

The present invention will also be described with reference to sub-circuits 32-36 generating binary codes $a_{7:0}$, $b_{7:0}$, and $c_{7:0}$ that equal one of the nine binary code states (1)-(9) shown in FIG. 4, it being understood that the present invention should not be limited thereto. In FIG. 4, the far left bit in each of the nine binary code states represents the most significant bit while the far right bit in each of the nine code states represents the least significant bit.

For purposes of explanation, first and second code generation sub-circuits 32 and 34, respectively, will be described as synchronous circuits that generate to $a_{7:0}$ and $b_{7:0}$, respectively, upon each rising edge of a clock signal provided thereto or upon each xth rising edge of the clock signal provided thereto. Moreover, each generated binary code $a_{7:0}$ and $b_{7:0}$ generated by first and second code generation sub-circuits 32 and 34, respectively, differs from the previously generated binary code $a_{7:0}$ and $b_{7:0}$, respectively, by only one bit, it being understood that the present invention should not be limited thereto. For example, first code generation circuit 32 may generate $a_{7:0}$ which equals binary code state (4) shown in FIG. 4. The next binary code $a_{7:0}$ generated by first code generation circuit 32 may equal binary code state (3) or (5) shown in FIG. 4. Regardless of whether the next binary code $a_{7:0}$ equals binary code state (3) or (5) shown in FIG. 4, the next binary code $a_{7:0}$ differs from the previously generated binary code $a_{7:0}$ (which equals binary code state (4) of FIG. 4) by only one bit. Lastly, the present invention will be described with reference to first and second code generation sub-circuits 32 and 34, respectively, generating binary codes $a_{7:0}$ and $b_{7:0}$ which differ by five bits or fewer, it being understood that the present invention should not be limited thereto. For example, if first code generation circuit 32 generates binary code $a_{7:0}$ at time $t_0$ equal to binary code state (9) in FIG. 4, then second code generation circuit 34 generates binary code $b_{7:0}$ at time $t_0$ equal to one and only one of the binary code states (4)-(8) in FIG. 4.

Figure 5A:
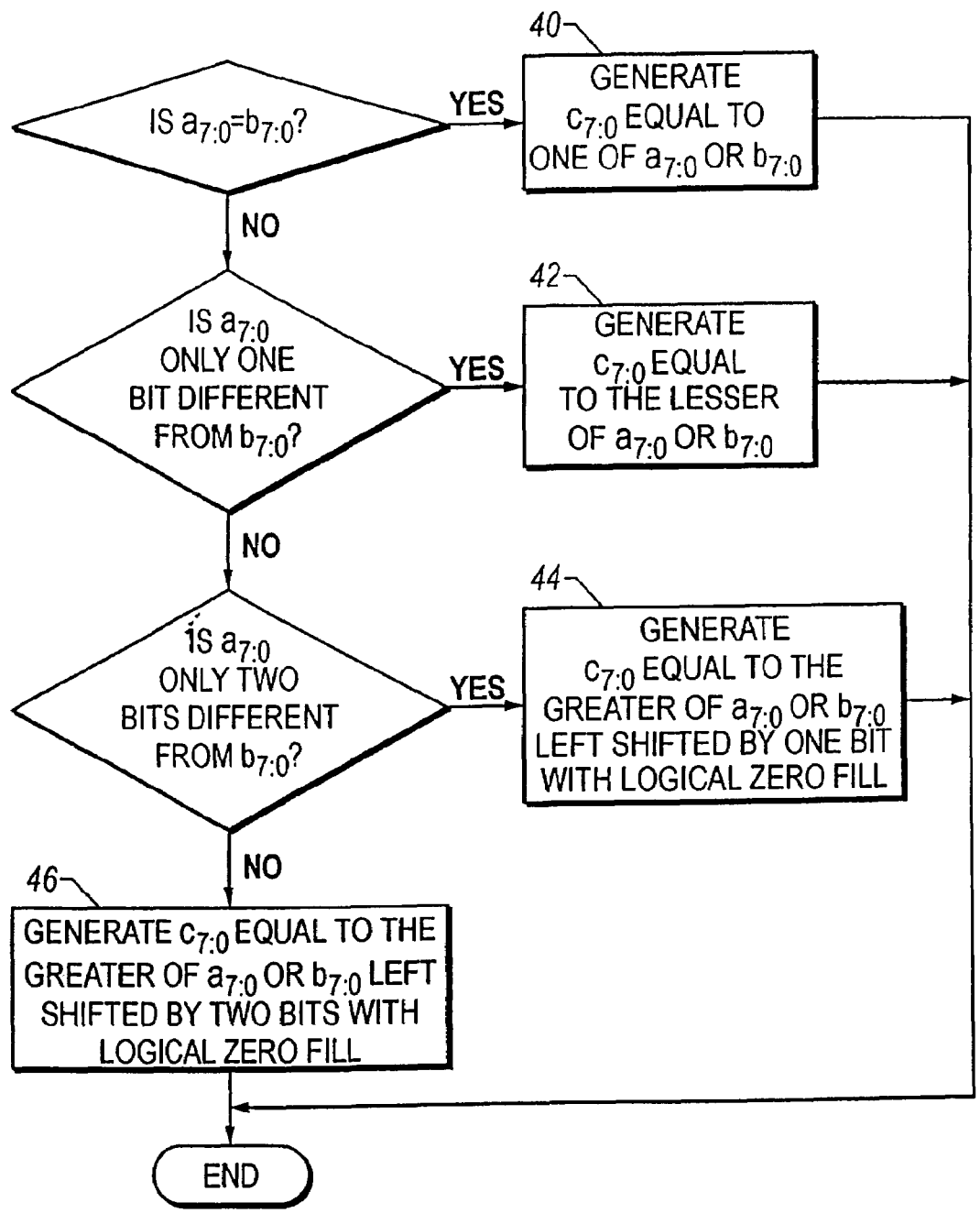
FIGS. 5A-C are flow charts illustrating operational aspects of the average code generation circuit shown in FIG. 3.
Figure 5B:
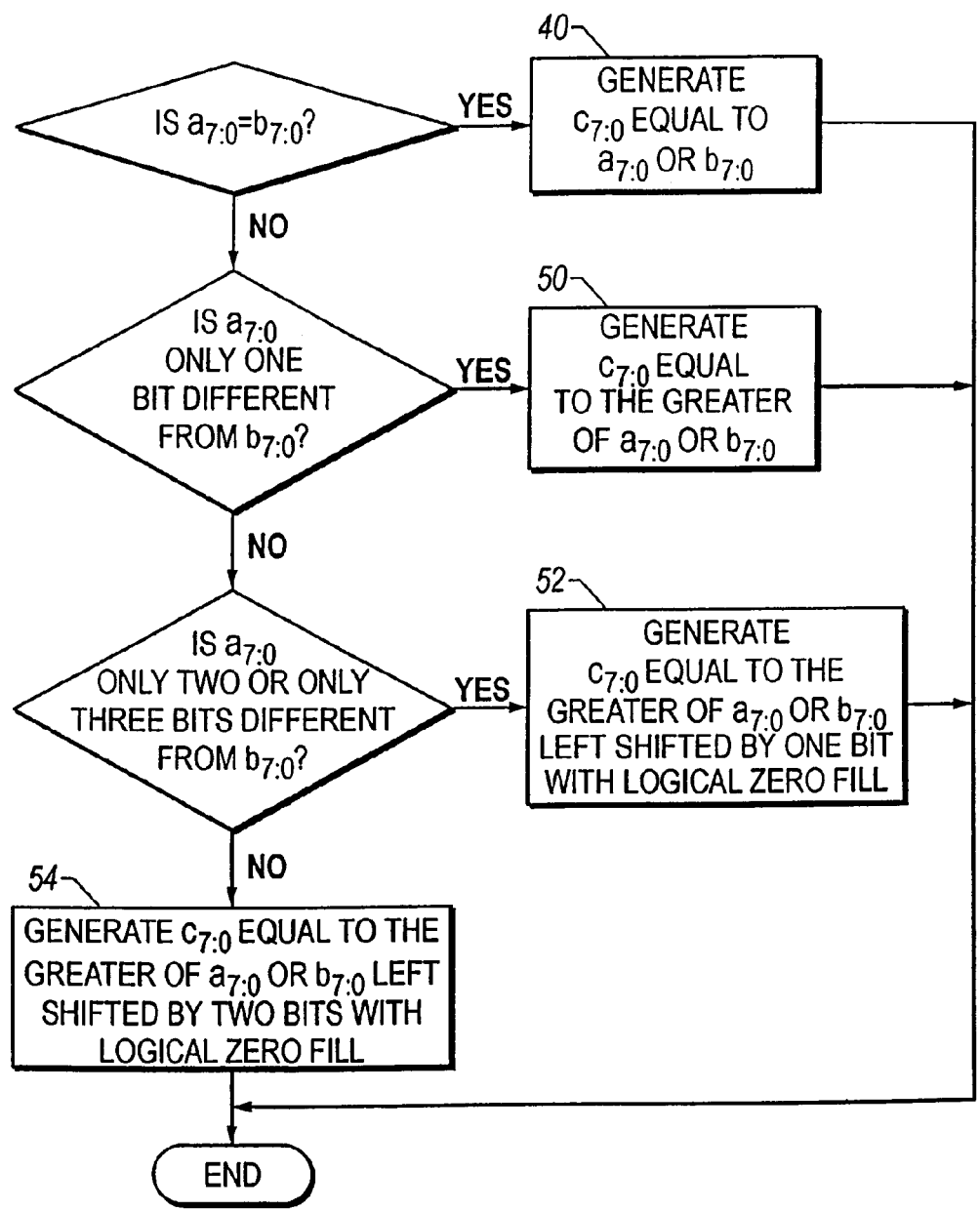
Figure 5C:
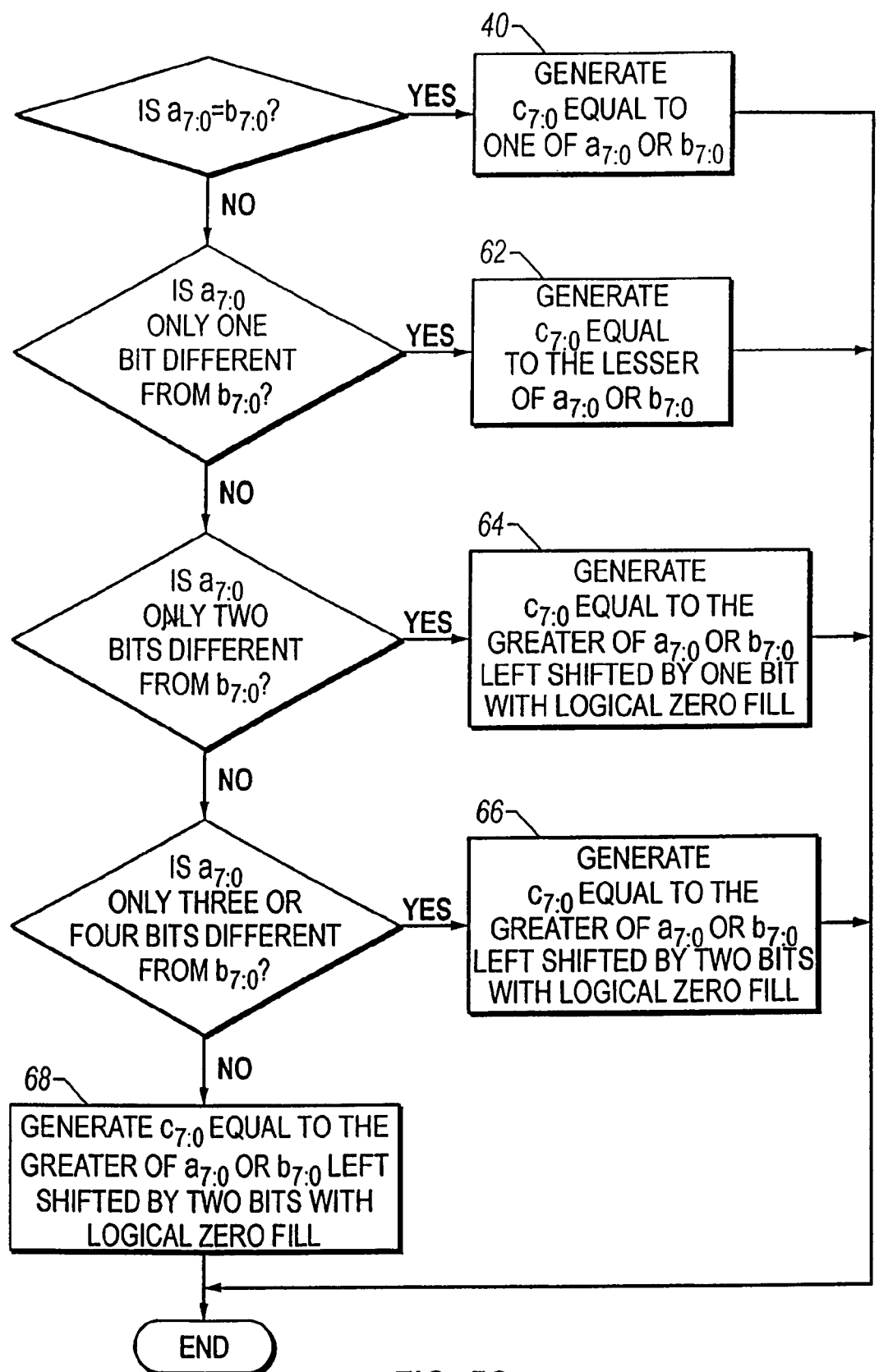

As noted above, average code generation sub-circuit 36 generates average code $c_{7:0}$ which represents an average of $a_{7:0}$ and $b_{7:0}$. An average of two distinct binary state codes may vary according to the definition of the term average. FIGS. 5A-5C are provided to illustrate various definitions of the term average as used herein.

FIG. 5A illustrates operational aspects of average code generation sub-circuit 36 operating in accordance with one embodiment of the present invention. FIG. 5A shows in step 40 that if $a_{7:0}$ and $b_{7:0}$ are equal to each other, then average code generation sub-circuit 36 generates $c_{7:0}$ equal to one of the inputs $a_{7:0}$ or $b_{7:0}$. It is noted that the average code generation sub-circuit 36 does not perform the operation of comparing $a_{7:0}$ to $b_{7:0}$.

If $a_{7:0}$ and $b_{7:0}$ differ from each other by only one bit, then, as shown in step 42, average code generation sub-circuit 36 generates average code $c_{7:0}$ which equals the lesser of $a_{7:0}$ or $b_{7:0}$. For purposes of definition $a_{7:0}$ is less than $b_{7:0}$ if the total number of bits set to logical one in $a_{7:0}$ is less than the total number of bits set to logical one in $b_{7:0}$, or vice versa. It is noted that average code generation sub-circuit 36 does not count the total number of bits of $a_{7:0}$ or $b_{7:0}$ set to logical one, nor does average code generation sub-circuit 36 compare the total number of bits set to logical one in $a_{7:0}$ and $b_{7:0}$.

As an example of step 42, suppose $a_{7:0}$ and $b_{7:0}$ equal the binary state codes shown immediately below.

$a_{7:0}$=11000000

$b_{7:0}$=11100000

In response to receiving $a_{7:0}$ and $b_{7:0}$ immediately above, code generation sub-circuit 36, according to step 42, generates $c_{7:0}$ equal to:

$c_{7:0}$=11000000.

If $a_{7:0}$ differs from $b_{7:0}$ by only two bits, then average code generation sub-circuit 36 generates $c_{7:0}$ which equals the greater of $a_{7:0}$ or $b_{7:0}$ left shifted by one bit with logical zero fill at the least significant bit as shown in step 44. It is noted that average code generation sub-circuit 36 does not perform a shifting operation on either input codes $a_{7:0}$ or $b_{7:0}$. Rather, average code generation sub-circuit 36 generates $c_{7:0}$ in step 44 as if average code generation sub-circuit 36 performed the shifting operation on one of the codes $a_{7:0}$ or $b_{7:0}$.

As an example of step 44, suppose $a_{7:0}$ and $b_{7:0}$ equal the binary state codes shown immediately below.

$a_{7:0}$=11000000

$b_{7:0}$=11110000

In response to receiving $a_{7:0}$ and $b_{7:0}$ immediately above, code generation sub-circuit 36, according to step 44, generates $c_{7:0}$ equal to:

$c_{7:0}$=11100000, which is equal to $b_{7:0}$ immediately above, left shifted by one bit with logical zero fill at the least significant bit thereof.

If $a_{7:0}$ differs from $b_{7:0}$ by three or more bits, then average code generation sub-circuit 36 generates $c_{7:0}$ which equals the greater of $a_{7:0}$ or $b_{7:0}$ left shifted by two bits with logical zero fill at the least significant bit as shown in step 46. Again, it is noted that the average code generation sub-circuit 36 does not perform a logical shifting operation on either of the binary code inputs.

As an example of step 46, suppose $a_{7:0}$ and $b_{7:0}$ equal the binary state codes shown immediately below.

$a_{7:0}$=11000000

$b_{7:0}$=11111110

In response to receiving $a_{7:0}$ and $b_{7:0}$ immediately above, code generation sub-circuit 36, according to step 46, generates $c_{7:0}$ equal to:

$c_{7:0}$=11111000, which is equal to $b_{7:0}$ immediately above, left shifted by two bits with logical zero fill at the least significant bit thereof.

FIG. 5B illustrates operational aspects of average code generation sub-circuit 36 operating in accordance with another embodiment of the present invention. FIG. 5B shows in step 40 that if $a_{7:0}$ and $b_{7:0}$ are equal to each other, then average code generation sub-circuit 36 generates $c_{7:0}$ equal to one of the inputs $a_{7:0}$ or $b_{7:0}$. Average code generation sub-circuit 36 does not perform the operation of comparing $a_{7:0}$ to $b_{7:0}$.

If $a_{7:0}$ and $b_{7:0}$ differ from each other by only one bit, then, as shown in step 50, average code generation sub-circuit 36 generates average code $c_{7:0}$ which equals the greater of $a_{7:0}$ or $b_{7:0}$. Average code generation sub-circuit 36 does not count the total number of bits of $a_{7:0}$ or $b_{7:0}$ set to logical one, nor does average code generation sub-circuit 36 compare the total number of bits set to logical one in $a_{7:0}$ and $b_{7:0}$.

As an example of step 50, suppose $a_{7:0}$ and $b_{7:0}$ equal the binary state codes shown immediately below.

$a_{7:0}$=11000000

$b_{7:0}$=11100000

In response to receiving $a_{7:0}$ and $b_{7:0}$ immediately above, code generation sub-circuit 36, according to step 50, generates $c_{7:0}$ equal to:

$c_{7:0}$=11100000

If $a_{7:0}$ differs from $b_{7:0}$ by only two bits or only three bits, then average code generation sub-circuit 36 generates $c_{7:0}$ which equals the greater of $a_{7:0}$ or $b_{7:0}$ left shifted by one bit with logical zero fill at the least significant bit as shown in step 44. Average code generation sub-circuit 36 does not perform a shifting operation on either input codes $a_{7:0}$ or $b_{7:0}$.

As an example of step 44 of FIG. 5B, suppose $a_{7:0}$ and $b_{7:0}$ equal the binary state codes shown immediately below.

$a_{7:0}$=11000000

$b_{7:0}$=11111000

In response to receiving $a_{7:0}$ and $b_{7:0}$ immediately above, code generation sub-circuit 36, according to step 44 of FIG. 5B, generates $c_{7:0}$ equal to:

$c_{7:0}$=11110000, which is equal to $b_{7:0}$ immediately above, left shifted by one bit with logical zero fill at the least significant bit thereof.

If $a_{7:0}$ differs from $b_{7:0}$ by more than three bits, then average code generation sub-circuit 36 generates $c_{7:0}$ which equals the greater of $a_{7:0}$ or $b_{7:0}$ left shifted by two bits with logical zero fill at the least significant bit as shown in step 46 of FIG. 5B.

As an example of step 46 of FIG. 5B, suppose $a_{7:0}$ and $b_{7:0}$ equal the binary state codes shown immediately below.

$a_{7:0}$=11000000

$b_{7:0}$=11111110

In response to receiving $a_{7:0}$ and $b_{7:0}$ immediately above, code generation sub-circuit 36, according to step 46 of FIG. 5B, generates $c_{7:0}$ equal to:

$c_{7:0}$=11111000, which is equal to $b_{7:0}$ immediately above, left shifted by two bits with logical zero fill at the least significant bit thereof.

FIG. 5C illustrates operational aspects of average code generation sub-circuit 36 operating in accordance with yet another embodiment of the present invention. FIG. 5C shows in step 40 that if $a_{7:0}$ and $b_{7:0}$ are equal to each other, then average code generation sub-circuit 36 generates $c_{7:0}$ equal to one of the inputs $a_{7:0}$ or $b_{7:0}$. Average code generation sub-circuit 36 does not perform the operation of comparing $a_{7:0}$ to $b_{7:0}$.

If $a_{7:0}$ and $b_{7:0}$ differ from each other by only one bit, then, as shown in step 42 of FIG. 5C, average code generation sub-circuit 36 generates average code $c_{7:0}$ which equals the lesser of $a_{7:0}$ or $b_{7:0}$. Average code generation sub-circuit 36 does not count the total number of bits of $a_{7:0}$ or $b_{7:0}$ which are set to logical one, nor does average code generation sub-circuit 36 compare the total number of bits set to logical one in $a_{7:0}$ and $b_{7:0}$.

As an example of step 42 of FIG. 5C, suppose $a_{7:0}$ and $b_{7:0}$ equal the binary state codes shown immediately below.

$a_{7:0}$=11000000

$b_{7:0}$=11100000

In response to receiving $a_{7:0}$ and $b_{7:0}$ immediately above, code generation sub-circuit 36, according to step 42 of FIG. 5C, generates $c_{7:0}$ equal to:

$c_{7:0}$=11000000

If $a_{7:0}$ differs from $b_{7:0}$ by only two bits, then average code generation sub-circuit 36 generates $c_{7:0}$ which equals the greater of $a_{7:0}$ or $b_{7:0}$ left shifted by one bit with logical zero fill at the least significant bit as shown in step 44 of FIG. 5C. Average code generation sub-circuit 36 does not perform a shifting operation on either input codes $a_{7:0}$ or $b_{7:0}$.

As an example of step 44 of FIG. 5C, suppose $a_{7:0}$ and $b_{7:0}$ equal the binary state codes shown immediately below.

$a_{7:0}$=11000000

$b_{7:0}$=11110000

In response to receiving $a_{7:0}$ and $b_{7:0}$ immediately above, code generation sub-circuit 36, according to step 44 of FIG. 5C, generates $c_{7:0}$ equal to:

$c_{7:0}$=11100000, which is equal to $b_{7:0}$ immediately above, left shifted by one bit with logical zero fill at the least significant bit thereof.

If $a_{7:0}$ differs from $b_{7:0}$ by only three bits or only four bits, then average code generation sub-circuit 36 generates $c_{7:0}$ which equals the greater of $a_{7:0}$ or $b_{7:0}$ left shifted by two bits with logical zero fill at the least significant bit as shown in step 46 of FIG. 5C.

As an example of step 46 of FIG. 5C, suppose $a_{7:0}$ and $b_{7:0}$ equal the binary state codes shown immediately below.

$a_{7:0}$=11000000

$b_{7:0}$=11111100

In response to receiving $a_{7:0}$ and $b_{7:0}$ immediately above, code generation sub-circuit 36, according to step 46 of FIG. 5C, generates $c_{7:0}$ equal to:

$c_{7:0}$=11110000, which is equal to $b_{7:0}$ immediately above, left shifted by two bits with logical zero fill at the least significant bit thereof.

If $a_{7:0}$ differs from $b_{7:0}$ by only five bits, then average code generation sub-circuit 36 generates $c_{7:0}$ which equals the greater of $a_{7:0}$ or $b_{7:0}$ left shifted by three bits with logical zero fill at the least significant bit as shown in step 52.

As an example of step 52, suppose $a_{7:0}$ and $b_{7:0}$ equal the binary state codes shown immediately below.

$a_{7:0}$=11000000

$b_{7:0}$=11111110

In response to receiving $a_{7:0}$ and $b_{7:0}$ immediately above, code generation sub-circuit 36, according to step 52, generates $c_{7:0}$ equal to:

$c_{7:0}$=11110000, which is equal to $b_{7:0}$ immediately above, left shifted by three bits with logical zero fill at the least significant bit thereof.

Figure 6A:
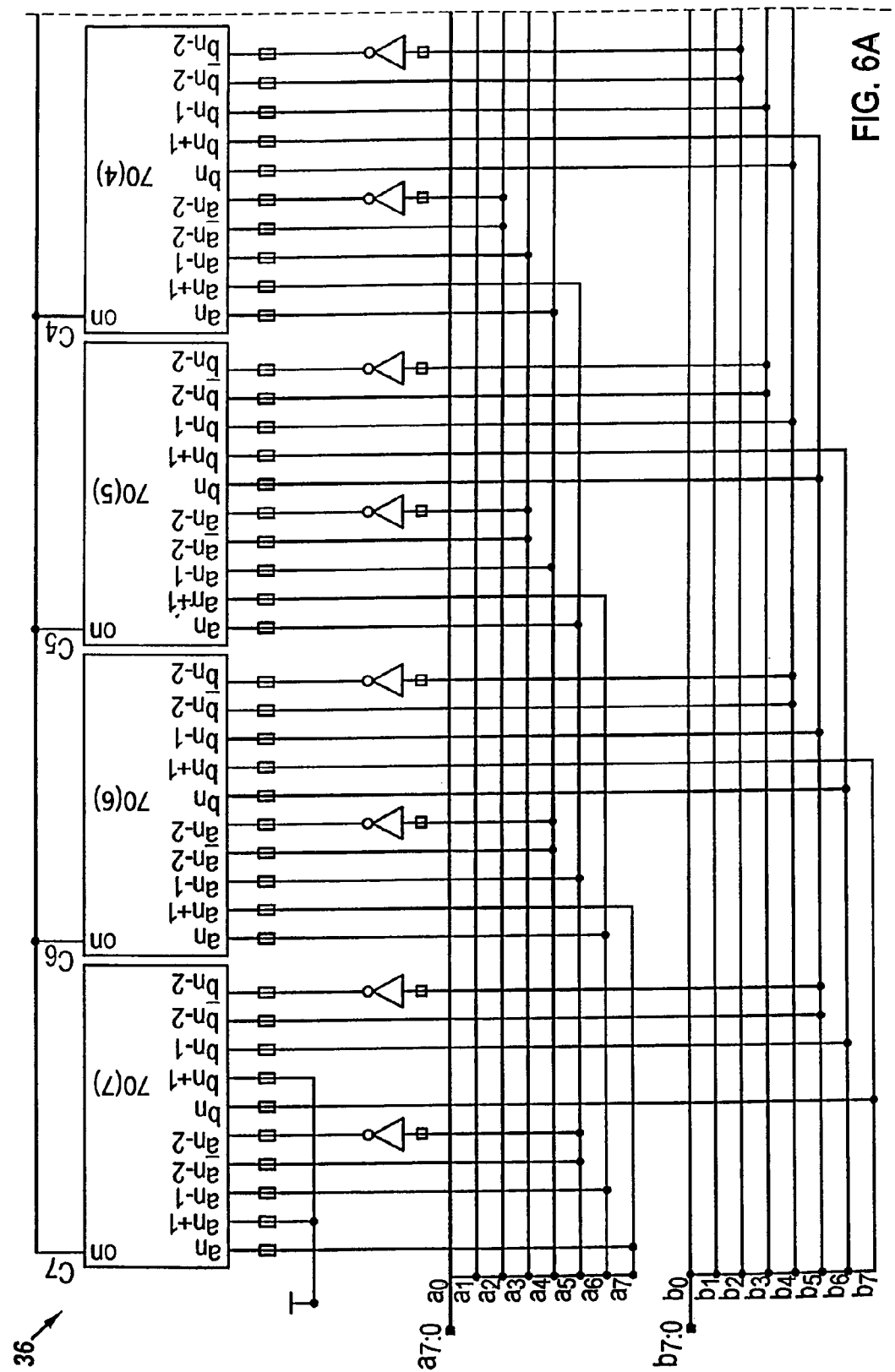
FIG. 6A and 6B are block diagrams illustrating relevant components of one embodiment of the average code generation circuit shown in FIG. 3.
Figure 6B:
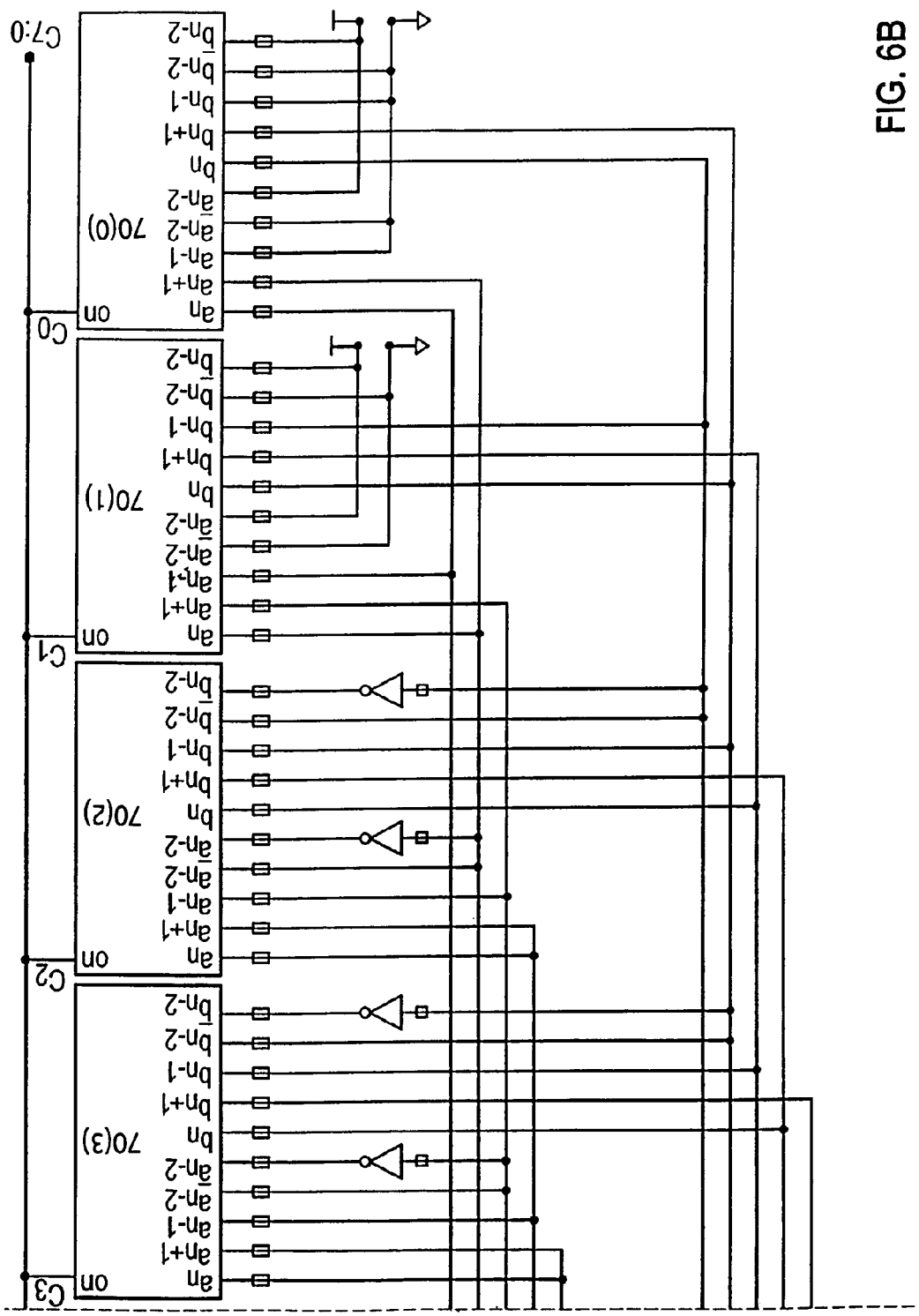

As noted above, average code generation sub-circuit 36 is an asynchronous circuit. In one embodiment, average code generation sub-circuit 36 consists entirely of logic gates (e.g., AND gates, NAND gates, OR gates, NOR gates, inventor gates, etc.) for generating average code $c_{7:0}$ in response to receiving input binary codes $a_{7:0}$ and $b_{7:0}$. FIG. 6 (divided into FIGS. 6A and 6B) illustrates in block diagram form one embodiment of the average code generation sub-circuit 36 shown in FIG. 4. Circuit 36 shown in FIG. 6 includes 8 sub-circuits 70(0) through 70(7). Additionally, sub-circuit 36 shown in FIG. 6 includes a plurality of inverting gates 72 as will be fully described below.

Figure 7:
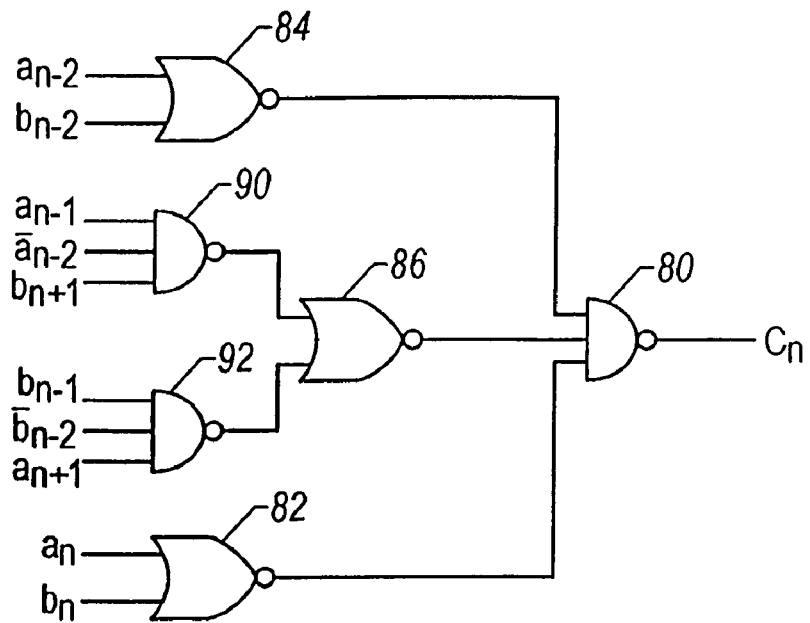
FIG. 7 is a block diagram illustrating relevant components of one embodiment of the sub-circuits of the average code generation circuit shown in FIGS. 6A and 6B.
Figure 8:
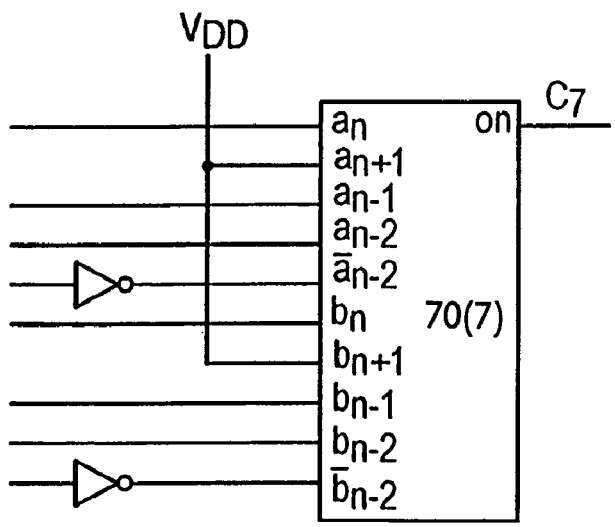
FIG. 8 is a block diagram illustrating one configuration of a sub-circuit of the average code generation circuit shown in FIG. 7.
Figure 9:
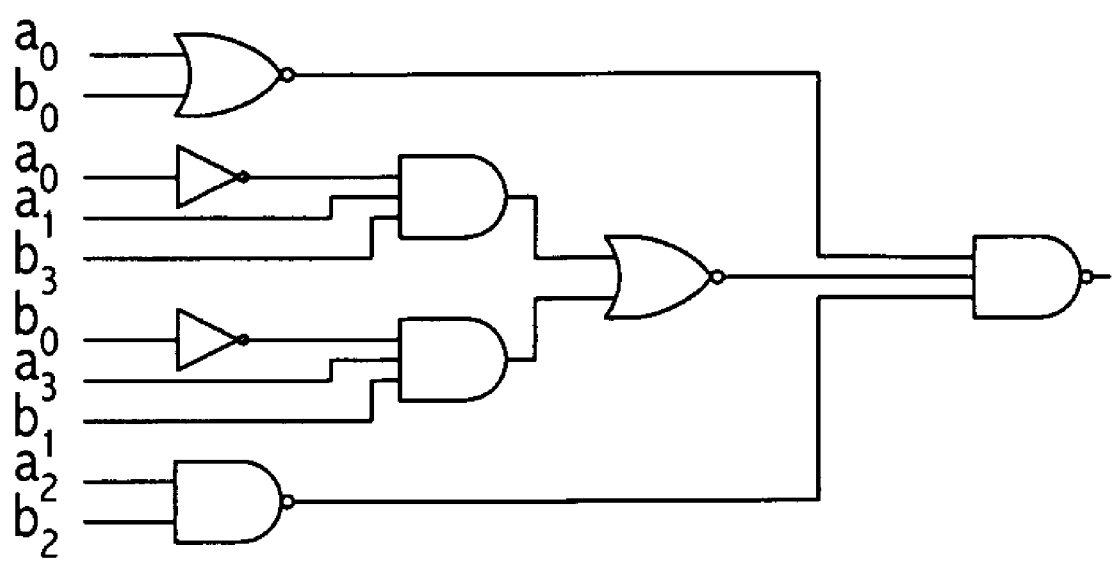
FIG. 9 is a block diagram illustrating relevant components of one embodiment of a sub-circuit of the average code generation circuit shown in FIGS. 6A and 6B.

In one embodiment, sub-circuits 70(0) through 70(7) are identical to each other. In this embodiment, each of the circuits 70(0)-70(7) includes ten inputs and a single output $c_n$. The inputs of circuits 70(0)-70(7) are designated as shown in FIGS. 6A, 6B, and 8. Moreover, the inputs are coupled to receive bits of input binary codes $a_{7:0}$ and $b_{7:0}$ as shown. FIG. 7 and FIG. 9 illustrate exemplary embodiments of circuits 70(0)-70(7) shown in FIGS. 6A and 6B. More particularly, FIG. 7 shows NAND gates 80, 90 and 92 and NOR gates 82, 84 and 86. The inputs to gates 82, 84, 90, and 92 are labeled to correspond to the inputs of sub-circuits 70(0)-70(7) of FIGS. 6A and 6B. It is noted that sub-circuits 70(0)-70(7) may take form in a combination of logic gates different than what is shown in FIG. 7 or FIG. 9.

Although the present invention has been described in connection with several embodiments, the invention is not intended to be limited to the specific forms set forth herein. On the contrary, it is intended to cover such alternatives, modifications, and equivalents as can be reasonably included within the spirit and scope of the invention as defined by the appended claims.

What is claimed is:

1. A method comprising:
   first and second circuits generating in-bit binary codes $a_{m-1:0}$ and $b_{m-1:0}$, respectively;
   an asynchronous circuit generating in-bit binary code $c_{m-1:0}$ in response to the asynchronous circuit receiving binary codes $a_{m-1:0}$ and $b_{m-1:0}$;
   wherein if binary codes $a_{m-1:0}$ and $b_{m-1:0}$ are identical to each other or if binary codes $a_{m-1:0}$ and $b_{m-1:0}$ differ from each other by only one bit, the asynchronous circuit generates binary code $c_{m-1:0}$ identical to one of the binary codes $a_{m-1:0}$ and $b_{m-1:0}$;
   wherein if binary codes $a_{m-1:0}$ and $b_{m-1:0}$ differ from each other by only two bits, the asynchronous circuit generates binary code $c_{m-1:0}$ which is identical to a result of left shifting one of the binary codes $a_{m-1:0}$ and $b_{m-1:0}$ by one bit with logical zero fill at the least significant bit thereof;
   wherein if binary codes $a_{m-1:0}$ and $b_{m-1:0}$ differ from each other by at least three bits, the asynchronous circuit generates binary code $c_{m-1:0}$ which is identical to a result of left shifting one of the binary codes $a_{m-1:0}$ and $b_{m-1:0}$ by two bits with logical zero fill at the least significant bit thereof;
   wherein m is at least three.

2. The method of claim 1 further comprising:
   the first circuit generating a first binary code $a_{m-1:0}$ at time $t=t_1$ and a second binary code $a_{m-1:0}$ at time $t=t_2$, wherein $t_2$ sequentially follows $t_1$;
   the second circuit generating a first binary code $b_{m-1:0}$ at time $t=t_1$ and a second binary code $b_{m-1:0}$ at time $t=t_2$,
   wherein the first binary code $a_{m-1:0}$ is only one bit different from the second binary code $a_{m-1:0}$;
   wherein the second binary code $a_{m-1:0}$ is identical to a result of left shifting the first binary code $a_{m-1:0}$ by one bit with logical zero fill at the least significant bit thereof or a result of right shifting the first binary code $a_{m-1:0}$ by one bit with logical one fill at the most significant bit thereof;
   wherein the second binary code $b_{m-1:0}$ is only one bit different from the second binary code $b_{m-1:0}$;
   wherein the second binary code $b_{m-1:0}$ is identical to a result of left shifting the first binary code $b_{m-1:0}$ by one bit with logical zero fill at the least significant bit thereof or a result of right shifting the first binary code $b_{m-1:0}$ by one bit with logical one fill at the most significant bit thereof.

3. The method of claim 1 wherein the first circuit and second circuits are synchronous and configured to receive a clock signal, wherein the first and second circuits generate $a_{m-1:0}$ and $b_{m-1:0}$ with each rising edge of the clock signal provided thereto.

4. The method of claim 1 wherein m is at least five and binary codes $a_{m-1:0}$ and $b_{m-1:0}$ differ from each other by five bits or less.

5. The method of claim 1 wherein individual ones of binary codes $a_{m-1:0}$ and $b_{m-1:0}$ include at most one series of consecutive zeros and at most one series of consecutive ones.

6. An integrated circuit comprising:
first and second circuits for generating m-bit binary code $a_{m-1:0}$ and $b_{m-1:0}$, respectively;
an asynchronous circuit coupled to the first and second circuits, wherein the asynchronous circuit is configured to generate an m-bit binary code $c_{m-1:0}$ representing an average of the binary codes $a_{m-1:0}$ and $b_{m-1:0}$ generated by the first and second circuits, respectively,
wherein individual ones of the m-bit binary codes $a_{m-1:0}$, $b_{m-1:0}$, and $c_{m-1:0}$ include at most one series of consecutive zeros and at most one series of consecutive ones;
a plurality of subcircuits, one of which comprises:
first and second nand gates;
first and second nor gates;
first and second and gates;
first and second inverter gates;
wherein outputs of the nor gates and the first nand gate are coupled to respective inputs of the second nand gate;
wherein outputs of the and gates are coupled to respective inputs of the second nor gate;
wherein outputs of the first and second inverter gates are coupled to respective first inputs of the first and second and gates, respectively;
wherein m=8;
wherein first and second inputs of the first nor gate are coupled to receive $a_0$ and $b_0$, respectively;
wherein second and third inputs of the first and gate are coupled to receive $a_1$ and $b_3$, respectively;
wherein second and third inputs of the second and gate are coupled to receive $a_3$ and $b_1$, respectively;
wherein the inputs of the first and second inverters are coupled to receive $a_0$ and $b_0$, respectively;
wherein first and second inputs of the first nand gate are coupled to receive $a_2$ and $b_2$, respectively.

7. The integrated circuit of claim 6 further comprising a plurality of first subcircuits each one of which comprises:
first and second nand gates;
first and second nor gates;
first and second and gates;
first and second inverter gates;
wherein outputs of the nor gates and the first nand gate are coupled to respective inputs of the second nand gate;
wherein outputs of the and gates are coupled to respective inputs of the second nor gate;
wherein outputs of the first and second inverter gates are coupled to respective first inputs of the first and second and gates, respectively.

8. An integrated circuit comprising:
first and second circuits for generating m-bit binary codes $a_{m-1:0}$ and $b_{m-1:0}$, respectively;
an asynchronous circuit for generating m-bit binary code $c_{m-1:0}$ in response to the asynchronous circuit receiving binary codes $a_{m-1:0}$ and $b_{m-1:0}$;
wherein if binary codes $a_{m-1:0}$ and $b_{m-1:0}$ are identical to each other or if binary codes $a_{m-1:0}$ and $b_{m-1:0}$ differ from each other by only one bit, the asynchronous circuit generates binary code $c_{m-1:0}$ identical to one of the binary codes $a_{m-1:0}$ and $b_{m-1:0}$;
wherein if binary codes $a_{m-1:0}$ and $b_{m-1:0}$ differ from each other by only two bits, the asynchronous circuit generates binary code $c_{m-1:0}$ which is identical to a result of left shifting one of the binary codes $a_{m-1:0}$ and $b_{m-1:0}$ by one bit with logical zero fill at the least significant bit thereof;
wherein if binary codes $a_{m-1:0}$ and $b_{m-1:0}$ differ from each other by three bits, the asynchronous circuit generates binary code $c_{m-1:0}$ which is identical to a result of left shifting one of the binary codes $a_{m-1:0}$ and $b_{m-1:0}$ by two bits with logical zero fill at the least significant bit thereof.

9. The integrated circuit of claim 8:
wherein the first circuit is configured to generate a first binary code $a_{m-1:0}$ at time $t=t_1$ and a second binary code $a_{m-1:0}$ at time $t=t_2$, wherein $t_2$ sequentially follows $t_1$;
wherein the second circuit is configured to generate a first binary code $b_{m-1:0}$ at time $t=t_1$ and a second binary code $b_{m-1:0}$ at time $t=t_2$,
wherein the first binary code $a_{m-1:0}$ is only one bit different from the second binary code $a_{m-1:0}$;
wherein the second binary code $a_{m-1:0}$ is identical to a result of left shifting the first binary code $a_{m-1:0}$ by one bit with logical zero fill at the least significant bit thereof or a result of right shifting the first binary code $a_{m-1:0}$ by one bit with logical one fill at the most significant bit thereof;
wherein the second binary code $b_{m-1:0}$ is only one bit different from the second binary code $b_{m-1:0}$;
wherein the second binary code $b_{m-1:0}$ is identical to a result of left shifting the first binary code $b_{m-1:0}$ by one bit with logical zero fill at the least significant bit thereof or a result of right shifting the first binary code $b_{m-1:0}$ by one bit with logical one fill at the most significant bit thereof.

10. The integrated circuit of claim 8 wherein the first circuit and second circuits are configured to receive a clock signal, wherein the first and second circuits generate $a_{m-1:0}$ and $b_{m-1:0}$ with each rising edge of the clock signal provided thereto.

11. The integrated circuit of claim 8 wherein m is at least five and the first and second circuits are configured to generate binary codes $a_{m-1:0}$ and $b_{m-1:0}$, respectively, which differ from each other by five bits or less.

12. The integrated circuit of claim 8 wherein individual ones of binary codes $a_{m-1:0}$ and $b_{m-1:0}$ include at most one series of consecutive zeros and at most one series of consecutive ones.

13. An integrated circuit comprising:
first and second circuits for generating m-bit binary codes $a_{m-1:0}$ and $b_{m-1:0}$, respectively;
an asynchronous circuit coupled to the first and second circuits, wherein the asynchronous circuit is configured to generate an m-bit binary code $c_{m-1:0}$ representing an average of the binary codes $a_{m-1:0}$ and $b_{m-1:0}$ generated by the first and second circuits, respectively, and wherein the asynchronous circuit includes
first, second, and third nand gates;
first, second, and third nor gates;
wherein respective outputs of the nor gates are coupled to respective inputs of the third nand gate, wherein respective outputs of the first and second nand gates are coupled to respective inputs of the second nor gate, wherein individual ones of the m-bit binary codes $a_{m-1:0}$, $b_{m-1:0}$, and $c_{m-1:0}$ include at most one series of consecutive zeros and at most one series of consecutive ones.

14. The integrated circuit of claim 13, wherein an output of the third nand gate is coupled to provide $c_n$, and $n^{th}$ bit of the binary code $c_{m-1:0}$;

wherein first and second inputs of the first nor gate are coupled to receive $a_{n-2}$ and $b_{n-2}$, respectively;

wherein first, second, and third inputs of the first nand gate are coupled to receive $a_{n-1}$, a complement of $a_{n-2}$, and $b_{n+1}$, respectively;

wherein first, second, and third inputs of the second nand gate are coupled to receive $b_{n-1}$, a complement of $b_{n-2}$, and $a_{n+1}$, respectively; and wherein first and second inputs of the third nor gate are coupled to receive $a_n$ and $b_n$, respectively.

* * * * *

UNITED STATES PATENT AND TRADEMARK OFFICE
CERTIFICATE OF CORRECTION

| | | |
|---|---|---|
| PATENT NO. | : 7,254,599 B2 | Page 1 of 1 |
| APPLICATION NO. | : 10/158695 | |
| DATED | : August 7, 2007 | |
| INVENTOR(S) | : Cong Q. Khieu and Louise Gu | |

It is certified that error appears in the above-identified patent and that said Letters Patent is hereby corrected as shown below:

In column 8, at line 20, delete "in-bit" and insert --m-bit--.

In column 8, at line 22, delete "in-bit" and insert --m-bit--.

Signed and Sealed this

Twenty-third Day of October, 2007

JON W. DUDAS
*Director of the United States Patent and Trademark Office*